United States Patent
Jungreis et al.

(10) Patent No.: US 6,930,897 B2
(45) Date of Patent: Aug. 16, 2005

(54) FUEL CELL INVERTER

(75) Inventors: Aaron M. Jungreis, Cary, NC (US); Jeffrey J. Parker, Zebulon, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/919,281

(22) Filed: Jul. 31, 2001

(65) Prior Publication Data

US 2003/0206424 A1 Nov. 6, 2003

(51) Int. Cl.[7] .............................................. H02M 7/44
(52) U.S. Cl. ........................................ 363/95; 363/101
(58) Field of Search ........................... 363/95, 98, 101, 363/125; 307/46, 66

(56) References Cited

U.S. PATENT DOCUMENTS

| | | | |
|---|---|---|---|
| 3,823,358 A | 7/1974 | Rey | 320/3 |
| 4,054,827 A | 10/1977 | Reimers | 363/28 |
| 4,225,912 A | 9/1980 | Messer | 363/57 |
| 4,336,585 A | 6/1982 | Moriarty et al. | 363/79 |
| 4,728,808 A * | 3/1988 | Bet-Esh et al. | 307/66 |
| 4,839,246 A | 6/1989 | Takabayashi | 429/12 |
| 5,156,928 A | 10/1992 | Takabayashi | 429/23 |
| 5,334,463 A | 8/1994 | Tajima et al. | 429/9 |
| 5,519,312 A | 5/1996 | Wang et al. | 323/360 |
| 5,637,414 A | 6/1997 | Inoue et al. | 429/13 |
| 5,929,538 A | 7/1999 | O'Sullivan et al. | 307/66 |
| 5,969,435 A | 10/1999 | Wilhelm | 307/64 |
| 5,994,793 A | 11/1999 | Bobry | 307/64 |
| 6,028,414 A | 2/2000 | Chouinard et al. | 320/110 |
| 6,321,145 B1 * | 11/2001 | Rajashekara | 701/22 |
| 6,369,461 B1 * | 4/2002 | Jungreis et al. | 307/46 |
| 6,370,050 B1 * | 4/2002 | Peng et al. | 363/98 |

* cited by examiner

*Primary Examiner*—Adolf Berhane
(74) *Attorney, Agent, or Firm*—Paul R. Katterle; Woodcock Washburn LLP

(57) ABSTRACT

The invention is directed to a method, system and device for converting direct current (DC) electrical voltage from a fuel cell to an alternating current (AC) voltage. The inventive method regulates power drawn from the fuel cell and from a battery to maintain a substantially constant DC voltage across a DC bus, and inverts the DC voltage from the DC bus to the AC voltage. The method may further electrically isolate the fuel cell from the load. Also, the inventive method may prevent current from flowing to the fuel cell. The inventive method may also provide a charging current to the battery.

41 Claims, 3 Drawing Sheets

FUEL CELL INVERTER

TECHNICAL FIELD

The invention relates generally to fuel cell power generation systems, and more particularly to efficiently inverting direct current (DC) voltage from a fuel cell unit to an alternating current (AC) voltage.

BACKGROUND OF THE INVENTION

Recently, as environmental concerns have moved to the forefront, there has been a push to provide a more efficient and cleaner form of energy. One proposed solution has been the fuel cell. The fuel cell is an electrochemical energy conversion device that converts fuel and oxygen into electricity, heat, and innocuous by-products such as water vapor. Emissions from the fuel cell system typically are significantly smaller than emissions from the cleanest fuel combustion processes.

A fuel cell system is made up of a number of individual fuel cells that form a fuel cell "stack." Fuel can be supplied to the fuel cell stack in a number of ways. For example, a proton exchange membrane (PEM) fuel cell can be fed directly from a source of hydrogen, or it can operate from hydrogen that is being supplied from a fuel reformer. Typically, the air required by most fuel cells is pumped to the fuel cell stack at a rate that varies with the load and/or various operating conditions. These other devices necessary to operate the fuel cell system (e.g., pumps and fans) are called the system's "balance-of-plant." The balance-of-plant components and the reformer typically cause a fuel cell stack to respond to the inevitable load changes much slower than batteries (i.e.,—the balance-of-plant and reformer are unable to keep up with instantaneous changes in the load).

Each individual cell in a fuel cell stack produces direct-current (DC) energy, typically with a high current and a low voltage (e.g., 0.7 volts). The low DC voltage produced by the fuel cell varies with the operating conditions such that the voltage is highest at no load and lowest at full load. A typical ratio between full-load and no-load voltage may be 2 or more. The DC energy produced by the fuel cell may be used both in stationary and mobile applications. Certain applications, for example residential and commercial loads, require an alternating current (AC) output. As a result, fuel cells, like many other alternative DC energy sources (e.g., solar energy) require an inverter to convert the DC voltage into AC voltage. Once converted, this AC source may be used as a stand-alone source and/or in parallel with the electrical power transmission grid that currently provides power to residential and commercial loads.

Fuel cells place many unusual constraints on the inverter device that is responsible for converting the fuel cell system's output to a regulated AC voltage. For example, the inverter must be able to adapt to the varying output voltage of the fuel cell. Also, the inverter must protect the fuel cell from a reverse current or an unstable input current, both of which could destroy the fuel cell. In addition, because the fuel source typically is incapable of instantaneously responding to the varying demands of the load, the inverter must be able to cooperate with a DC storage source (e.g., a battery) as well as the fuel cell. As a result of these differences, traditional power inverters can not satisfy the requirements of the fuel cell system, particularly in stand-alone applications (i.e., where the fuel cell inverter directly powers the load).

Therefore, it would be advantageous to provide a high efficiency DC-to-AC inverter suited to accommodate the unique operation of the fuel cell powered system.

SUMMARY OF THE INVENTION

The invention is directed to a method, system and device for converting direct current (DC) electrical voltage from a DC power source that provides varying DC voltage (e.g., a fuel cell) to an alternating current (AC) voltage. The inventive method controls DC power drawn from the fuel cell, and controls DC power drawn from a battery based on power available from the fuel cell. In so doing, the method maintains a substantially constant DC voltage on a DC bus. The inventive method further inverts the DC voltage from the DC bus to the AC voltage. The method further may provide the AC voltage to a load, and may electrically isolate the fuel cell from the load. Also, the inventive method may prevent current from flowing to the fuel cell. The inventive method may provide a charging current to the DC voltage source, as well as maintaining a constant DC voltage.

The inventive system includes a DC-to-AC inverter, a DC bus coupled to the DC-to-AC inverter (e.g., an H-bridge inverter), and a battery coupled to the DC bus via a charge/discharge controller. Also, the system includes a converter (e.g., a boost converter) coupled to the DC bus and to the fuel cell. The inventive system also may include an isolation device, for example an electrical transformer that is coupled to the DC-to-AC inverter. Also, the system may include a protection device coupled to the fuel cell that is designed to prevent current from flowing into the fuel cell. The inverter may be designed to operate with a low voltage input. When an increase in load demand occurs, the inverter draws power from the battery equal to the increased demand until the fuel cell is able to support the increased load demand. Also, when other types of load transients occur or when load demands exceed a capacity of the fuel cell, the controller regulates power drawn from the battery and the fuel cell. The system may be used to provide power to a load directly, or to provide power to a load via an electrical power transmission grid.

The inventive device includes an inverter (e.g., an H-bridge inverter) that converts DC power, which may have a low voltage, from the fuel cell to an AC power. The device further includes a battery and a boost converter. The boost converter maintains a substantially constant DC voltage to the DC bus by regulating power from the fuel cell. The boost converter also is designed to provide a charging current to the battery. The diode that forms a fundamental part of the boost converter prevents current from flowing to the fuel cell. An optional electrical transformer provides electrical isolation between the fuel cell and the load. When an increase in load demand occurs, the boost converter draws power from the battery equal to the increased demand until the fuel cell is able to support the increased load demand. Also, during load transients and when the load demand exceeds the capacity of the fuel cell, the inverter draws power from the battery via the charge/discharge controller and from the fuel cell via the boost converter.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Figure 1:
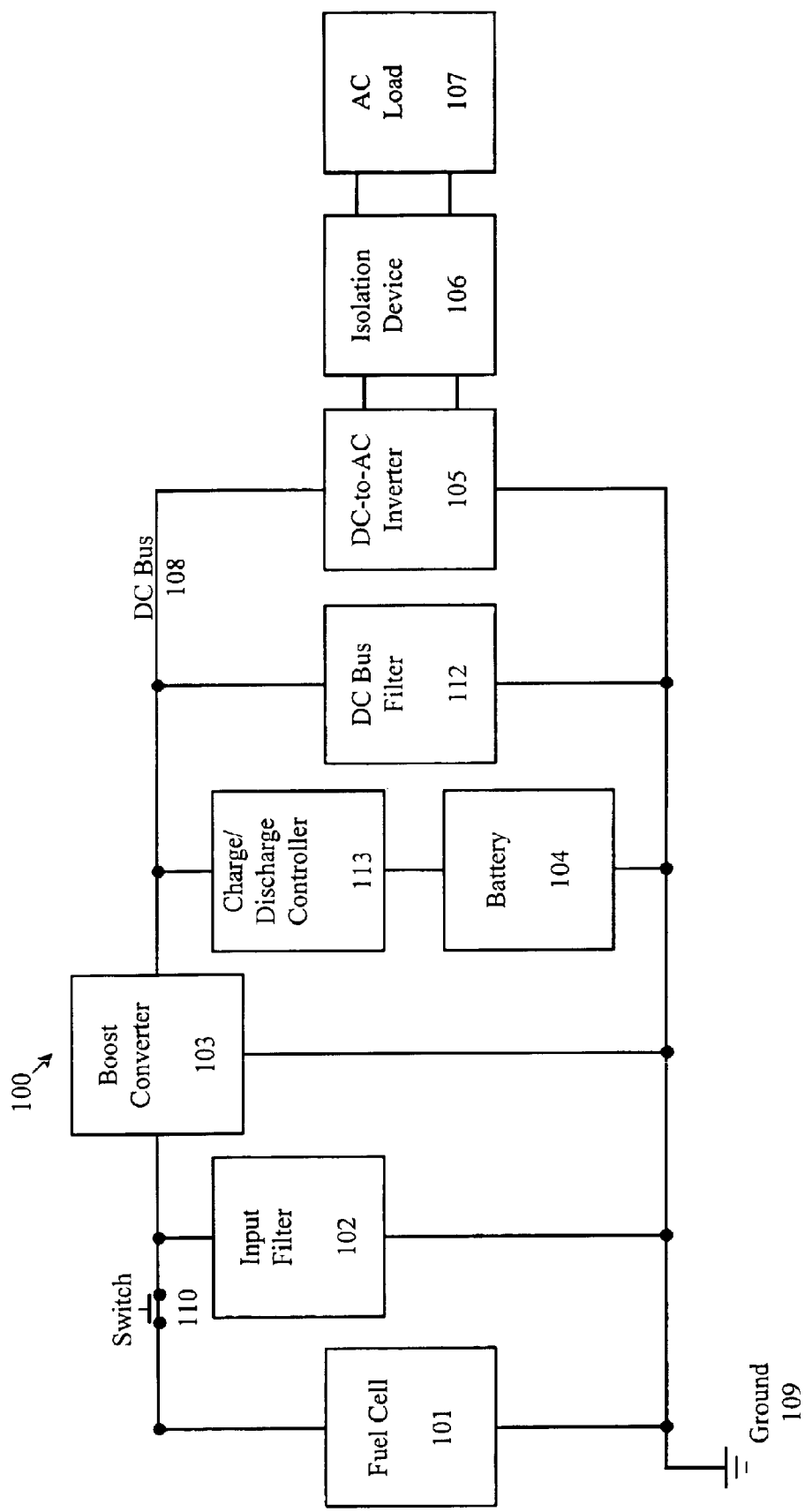
FIG. 1 provides a block diagram of a fuel cell inverter circuit, in accordance with the invention.

FIG. 1 provides a block diagram of a fuel cell inverter circuit 100, in accordance with the invention. As shown in FIG. 1, a fuel cell 101 is coupled to the remainder of circuit 100 via a switch 110 that operates to disconnect fuel cell 101 from the remainder of circuit 100. The input of a boost converter 103 is coupled to input filter 102 and it is also coupled to fuel cell 101 via switch 110. A charge/discharge controller 113 and a battery 104 (coupled in series to each other) are coupled to the output of boost converter 103. Battery 104 is sized to produce a voltage greater than or equal to the maximum operating voltage of fuel cell 101. A DC bus filter 112 and the input to a DC-to-AC inverter 105 are both coupled to the output side of boost converter 103. The output of boost converter 103, charge/discharge controller 113, and the input of DC-to-AC inverter 105 are coupled to a DC bus 108. DC bus 108 typically is designed to operate at voltages slightly above the voltage level of battery 104. Also, circuit 100 optionally can be coupled to a ground potential 109.

An optional isolation circuit 106 is coupled to the output of DC-to-AC inverter 105. Isolation circuit 106 also is coupled to an AC load 107. AC Load 107 may be any energy-consuming device (e.g., motor, lighting) that can operate with AC current. AC Load 107 may be an electrical power transmission grid (as discussed with reference to FIG. 3), or other AC voltage source.

Fuel cell 101 produces a low DC voltage at a high current. The voltage produced by fuel cell 101 varies with load and operating conditions. Also, the requirements of AC load 107 tend to vary over time. The varying power required by AC load 107 tends to create a fluctuating voltage at the output of fuel cell 101. However, boost converter 103, charging/discharging controller 113 and battery 104 operate to provide a nearly constant bus voltage to DC bus 108, despite the fluctuating voltage provided by fuel cell 101. For example, when a positive load step change occurs (e.g., when AC load 107 draws a greater quantity of power), battery 104 provides power to DC bus 108 (through charge/discharge controller 113) equal to the step change until fuel cell 101 is able to support the entire quantity of load 107.

The amount of power provided by fuel cell 101 to DC bus 108 is determined by boost converter 103, which allows full control of the power provided by fuel cell 101. When the available power from fuel cell 101 begins to decrease (e.g., because of a lack of fuel supply), boost converter 103 draws less power from fuel cell 101 and charge/discharge controller 113 draws additional power from battery 104. Boost converter 103 permits the power drawn from fuel cell 101 to be increased gradually as it becomes capable of providing the full power requirements of AC load 107. When the available fuel cell power exceeds the load power (plus power consumed by inefficiencies of the inverter), the boost converter 103 is responsible for maintaining the voltage provided to DC bus 108. If, however, the available fuel cell power is lower than the required load power, then the voltage on DC bus 108 is regulated by battery 104 and charge/discharge controller 113. Battery 104 operates to provide power both during load transients and during peak loads that exceed the rating of fuel cell 101.

When fuel cell 101 has enough reserve power to both charge battery 104 and to supply the power demanded by AC load 107, fuel cell 101 provides power to DC bus 108. In this case, charge/discharge controller 113 operates to stop the flow of current from battery 104 to DC bus 108, and provide the flow of current from DC bus 108 to battery 104. As a result, boost converter 103 operates to maintain a nearly constant voltage on DC bus 108.

DC-to-AC inverter 105 converts the DC voltage on DC bus 108 to an AC voltage, suitable for AC load 107. DC-to-AC inverter 105 is designed to operate with a low voltage input, like that provided by fuel cell 101. Isolation device 106 provides electrical isolation between AC load 107 and DC-to-AC inverter 105. Therefore, fuel cell 101 and the remainder of circuit 100 may be protected from any electrically adverse conditions (e.g., power surges) initiated on the load side of the system. The isolation device 106 also allows for the possibility of connecting battery 104 and fuel cell 101 to an earthed ground (e.g., for safety reasons).

Figure 2:
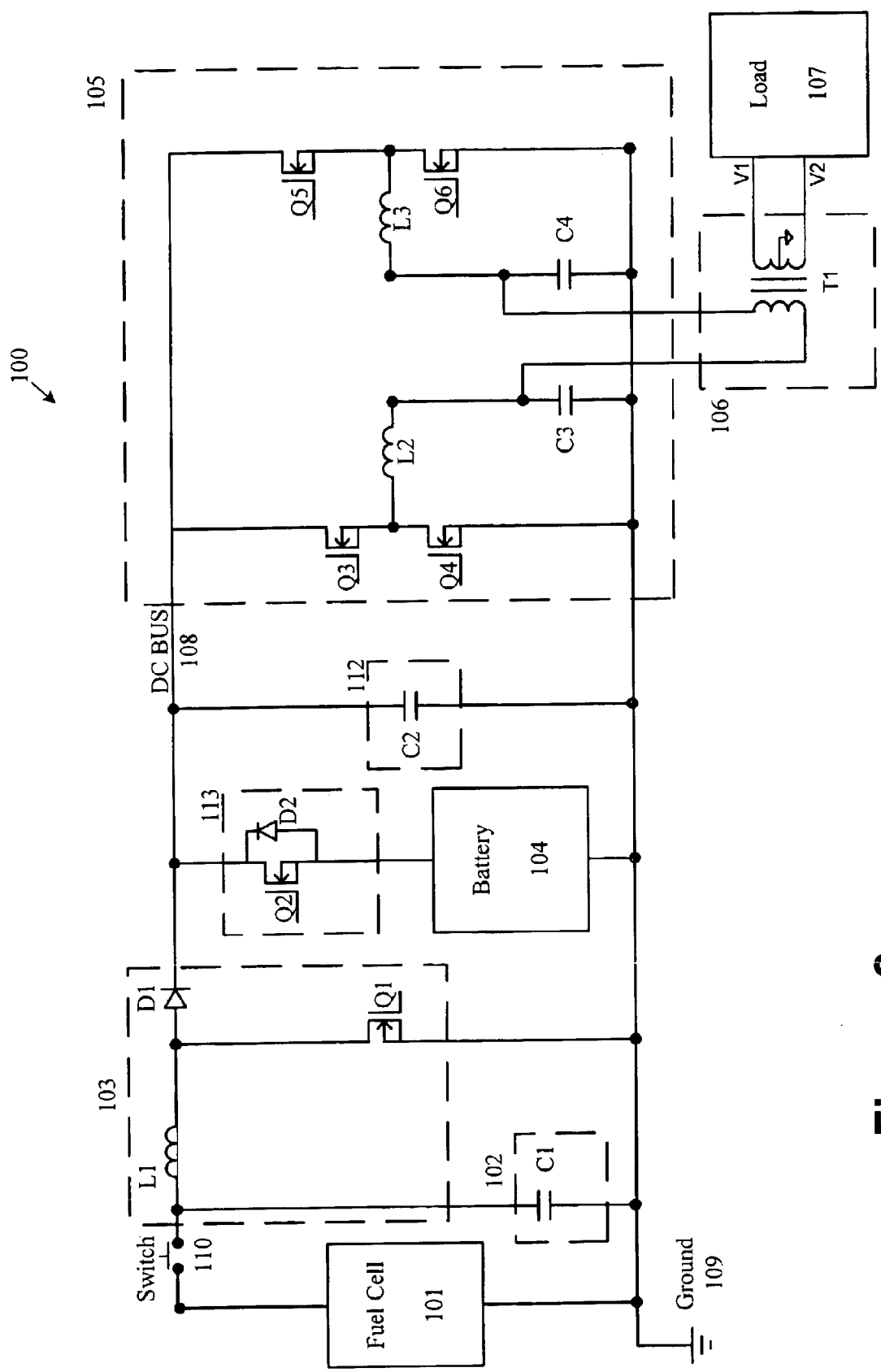
FIG. 2 provides a component-level block diagram of the fuel cell inverter circuit shown in FIG. 1.

FIG. 2 provides an example of a component-level block diagram of fuel cell inverter circuit 100, shown in FIG. 1. Although FIG. 2 provides specific components within the elements shown in FIG. 1, it should be appreciated the components of FIG. 2 are not exclusive, and other similar components may be used.

As shown in FIG. 2, input filter 102 includes a capacitor C1. Charge/discharge controller 113 includes a small MOSFET Q2 coupled in anti-parallel with a diode D2. It should be appreciated that diode D2 can be the body diode of MOSFET Q2 or a separate diode, like a Schottky diode. Use of a separate diode allows for battery discharge current to be much greater than battery charging current. MOSFET Q2 operates to permit the flow of current from DC bus 108 to battery 104 (i.e., charging battery 104). Diode D2 operates to permit the flow of current from battery 104 to DC bus 108 (i.e., discharging battery 104). Boost converter 103 includes a MOSFET Q1 a diode D1, and an inductor L1. DC bus filter 112 includes a capacitor C2.

DC-to-AC inverter 105 includes a combination of components that form an H-bridge inverter, and associated filtering components. In particular, one half of the H-bridge inverter includes MOSFETs Q3 and Q4, inductor L2, and capacitor C3. MOSFETs Q3 and Q4 form one-half of the H-bridge, and inductor L2 and capacitor C3 provide filtering. The other half of the H-Bridge inverter includes MOSFETs Q5 and Q6, inductor L3, and capacitor C4. MOSFETs Q5 and Q6 form one-half of the H-bridge, and inductor L3 and capacitor C4 provide filtering. The output of the H-Bridge Inverter is coupled to isolation device 106, which may be a transformer T1, for example. In this instance, transformer T1 is coupled on its primary side to the H-bridge inverter, and on its secondary side to AC load 107.

In one embodiment, semiconductor switches Q1, Q3, Q4, Q5, and Q6 are 100 volt MOSFETs. As compared to other semiconductor devices that have a nearly constant voltage drop regardless of current flow, for example, Insulated Gate Bipolar Transistors (IGBTs), the MOSFETs are selected so as to reduce losses when the output load is a fraction of the inverter's full-load rating.

In operation, fuel cell 101 provides a low-voltage, high-current power source to the remainder of circuit 100. The precise value of the available voltage and current from fuel cell 101 may be varied with the number of fuel cells stacked together, based upon the required demand of load 107. The power generated by fuel cell 101 then passes through a closed switch 110. Capacitor C1 acts as source of high-frequency current. Although capacitor C1 is shown separate from boost converter 103, it should be appreciated that capacitor C1 may be incorporated within boost converter 103.

Because fuel cell 101 may not be able to satisfy the demand of AC load 107 at various times throughout the operation of circuit 100, boost converter 103 operates to regulate power provided by fuel cell 101. More specifically, diode D2 operates to detect whether fuel cell 101 can meet the power demanded by AC load 107. When the average power provided by fuel cell 101 can not meet the average required demand of AC load 107, the voltage on DC bus 108 drops below the battery voltage and diode D2 becomes forward biased. The forward biased diode D2 permits current to flow from battery 104 to DC bus 108. If, on the other hand, fuel cell 101 provides sufficient power on DC bus 108 to operate AC load 107, and if battery 104 needs to be charged, MOSFET Q2 can be operated in the active region to maintain a constant float voltage across battery 104.

Using MOSFET Q2 allows a constant current to flow into battery 104 by absorbing and preventing a ripple voltage present on DC bus 108 (as discussed below with reference to DC-to-AC inverter 105) from appearing across battery 104. Notably, the DC bus voltage is nominally higher than the battery voltage, so that the voltage across MOSFET Q2 is small (e.g., 1 to 5 V). In effect, therefore, charge/discharge controller 113 operates to conduct the unregulated discharging flow of current from battery 104 to DC bus 108 using D2, while properly regulating the flow of charging current to battery 104 using Q2.

Boost converter 103 operates to regulate the amount of power provided by fuel cell 101. As a result, boost converter 103 permits battery 104 and fuel cell 101 to cooperate so as to maintain a substantially constant DC voltage on DC bus 108. Fuel cell 101 is protected from reverse current (e.g., current from DC bus 108 back to fuel cell 101) by diode D1 in boost converter 103. Typically, for low voltage sources (like fuel cell 101) that require reverse current protection, a series-connected diode's voltage drop can introduce a significant loss, especially at partial loads. Because of the operation of boost converter 103, however, diode D1 provides reverse current protection at a reduced current (as compared to placing the diode directly in series with fuel cell 101), thus increasing the overall efficiency of the circuit. Capacitor C2 filters the high frequency current on the output of boost converter 103, as well as filtering the AC current required by inverter 105.

Inverter 105 uses an H-bridge Inverter configuration to convert the voltage from DC provided by DC bus 108 to AC voltage that feeds AC load 107. Therefore, the H-bridge Inverter facilitates controlled power flow between DC and AC circuits. The H-bridge Inverter includes two half-bridges (Q3/Q4 and Q5/Q6) and two corresponding filters (L2/C3 and L3/C4, respectively). Inverter 105 typically draws power from DC bus 108 at a frequency that is twice that of the inversion frequency. For example, power drawn from DC bus 108 will have a significant 120 Hz ripple component if the inverter produces 60 Hz power. DC bus 108 will therefore have a voltage with a 120 Hz ripple component.

As is well known to those skilled in the art, an inherent feature of the MOSFET is that it acts as a diode (i.e., a "body diode") for current flowing in the reverse direction. During normal operation, the load current flows through a MOSFET in each half-bridge for a period of time, and a MOSFET body-diode in each half-bridge for a period of time. Notably, the period of time that the current flows through the body-diode will increase if the voltage on DC bus 108 increases above its minimum designed operating level. However, in order to obtain efficient operation during partial load situations, boost converter 103 and battery 104 in conjunction with charge/discharge controller 113 will operate to keep the voltage on DC bus 108 nearly constant (as discussed above with reference to boost converter 103), so to beneficially minimize the duration of current flow through the body diodes.

The H-bridge inverter converts the DC voltage from fuel cell 101 to AC voltage for AC load 107 by designing the filters (L2/C3 and L3/C4) to pass the desired frequency of the line voltage (e.g., 60 Hz or 50 Hz), while removing the high-frequency switching component (e.g., 20 kHz) of voltage. The MOSFETs are pulse width modulated to provide the respective half-bridge filter components with voltages that are 180° out of phase with each other, so as to create a sinewave across transformer T1. The voltages across C3 and C4 are sinewaves that are 180° out of phase with each other so that the sinewave applied to the primary of transformer T1 has twice the amplitude of the sinusoidal voltage across either C3 or C4.

The filtering components create fluctuating voltage waves with a small amount of high-frequency ripple created by the pulse wave modulation. Because the voltage between either leg of the primary on transformer T1 and ground 109 has only a very small high-frequency voltage component, the emitted electromagnetic radiation is significantly reduced.

Transformer T1 provides isolation between load 107 and circuit 100. Transformer T1 also may be designed such that the sum total kVA rating of its secondary windings is greater than the kVA rating of its primary winding. Such design accommodates the possibility that either secondary may carry the greater current at any particular time. Therefore, transformer T1 beneficially provides a method to power unbalanced loads without increasing the rating of the semiconductor switches. Such capability is especially relevant for stand-alone split-phase loads (e.g., residential applications).

Figure 3:
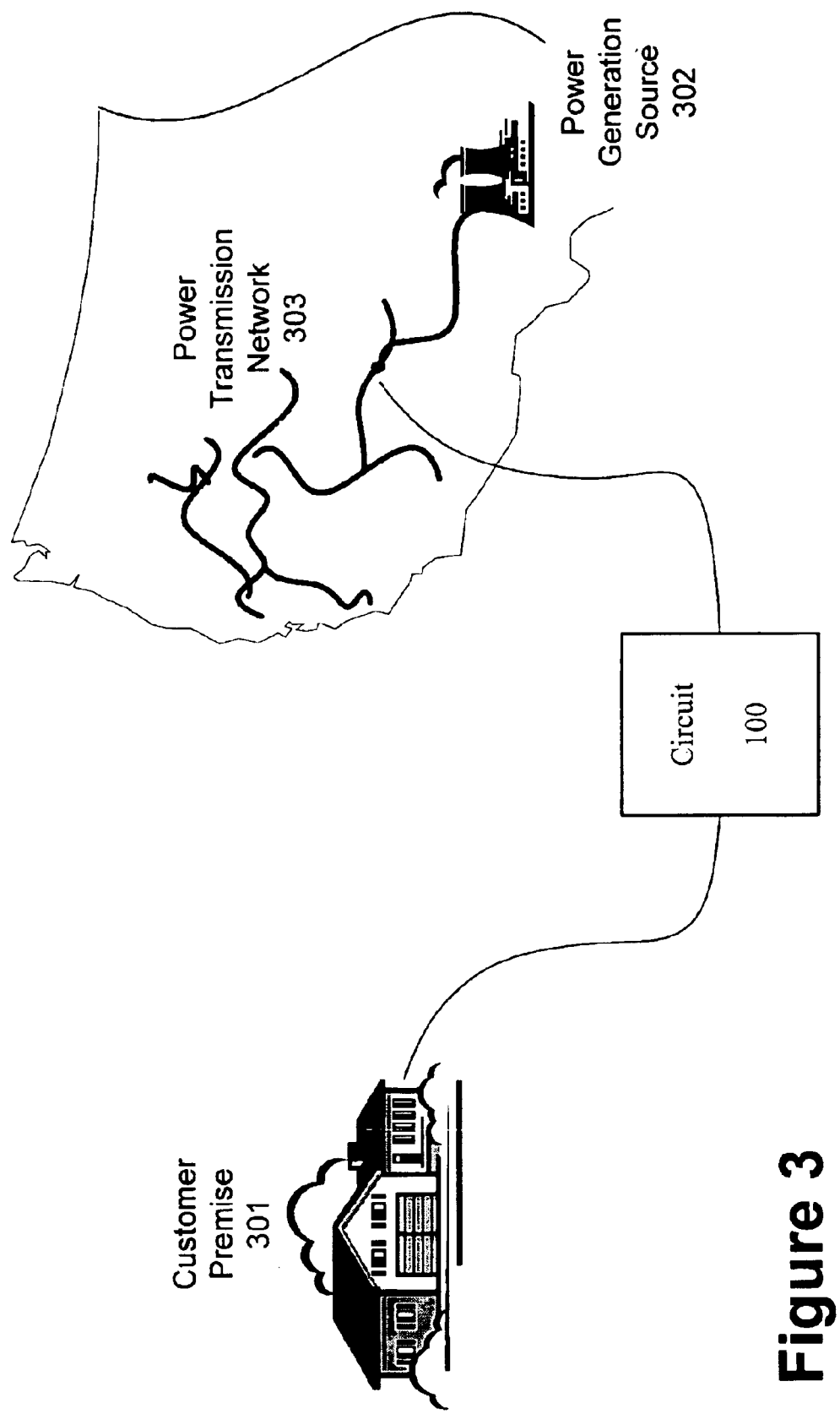
FIG. 3 provides a block diagram of certain applications of the fuel cell inverter circuit shown in FIG. 1, in accordance with the invention.

It should be noted that the circuit configuration shown in FIG. 2 permits operation in grid-parallel and/or stand-alone mode. FIG. 3 is a block diagram showing the use of circuit 100 coupled to a customer premise 301 (i.e., stand-alone mode) and/or a power transmission network 303 (i.e., grid-parallel mode). Power transmission network 303 is a network of high-voltage transmission lines that connect producers of electric power to the end customer (e.g., customer premise 301). In the United States, there are ten regional networks or "grids" (e.g., Mid-America Interconnected Network and Western System Coordinating Council) collectively serving the power needs in the United States. Power transmission network 303 may receive power from at least one power generation source 302, such as a nuclear power plant or hydroelectric power generation plant.

When coupled to power transmission network 303, the network causes a sinusoidal voltage to appear across filter capacitors C3 and C4 of DC-to-AC inverter 105. Pulse-width modulation may be used to control the half-bridges of circuit 100 to produce a substantially sinusoidal current through filter inductors L2 and L3. The resulting substantially sinusoidal current may have a frequency substantially similar to the voltage of power transmission network 303. When coupled to customer premise 301, the voltage across filter capacitors C3 and C4 in circuit 100 may be monitored by a separate device (not shown) so as to maintain a sinusoidal voltage at the desired frequency of customer premise 301 (e.g. 60 Hz for residential premises). Furthermore, by monitoring the current entering the residence, it is possible to modify the current produced by inverter 100 to provide overall power factor correction and/or to prevent net power generation by the residence.

The scope of protection of the following claims is not limited to the embodiments described above. Those skilled in the art will recognize that modifications and variations of the specific embodiments disclosed herein will fall within the true spirit and scope of the invention.

While the invention has been particularly shown and described with reference to the embodiments thereof, it will be understood by those skilled in the art that the invention is not limited to the embodiments specifically disclosed herein. For example, although the invention was described using certain electronic components with specific ratings, it should be appreciated that those components may be replace or rearranged without exceeding the scope of the invention. Those skilled in the art will appreciate that various changes and adaptations of the invention may be made in the form and details of these embodiments without departing from the true spirit and scope of the invention as defined by the following claims.

What is claimed is:

1. A method for supplying power to an external load, comprising:
   providing a DC power source, a converter, a battery and a DC bus;
   supplying DC power from the DC power source to the converter;
   supplying DC power from the converter to the DC bus;
   controlling the amount of DC power provided from the converter to the DC bus based on the DC power available from the DC power source, wherein the DC power source provides varying DC voltage;
   controlling the amount of DC power provided from the battery to the DC bus based on the amount of DC power supplied to the DC bus from the converter;
   maintaining a substantially constant DC voltage on the DC bus
   inverting the DC voltage from the DC bus to AC voltage; and
   supplying the AC voltage to the external load.

2. The method of claim 1, wherein the controlling of DC power from the converter is a function of power required by the external load, whereby when the external load increases, DC power provided from the converter to the DC bus is increased gradually as the DC power source becomes capable of providing increased DC power.

3. The method of claim 1, further comprising electrically isolating the fuel cell from the external load.

4. The method of claim 1, wherein the controlling of the amount of DC power provided from the battery to the DC bus comprises determining if the voltage on the DC bus is below the voltage of the battery and, it so, discharging power from the battery to the DC bus, wherein the discharging flow of power from the battery to the DC bus is uncontrolled.

5. The method of claim 1, further comprising the step of supplying DC power from the converter to the battery, wherein the supply of DC power from the converter to the battery is controlled.

6. The method of claim 1, wherein the DC power source is a fuel cell.

7. The method of claim 1, further comprising preventing current from flowing to the DC power source.

8. A system for converting DC electrical voltage from a DC power source to an AC voltage, wherein the DC power source provides varying DC voltage, the system comprising:
   a DC-to-AC inverter;
   a DC bus coupled to the DC-to-AC inverter;
   a converter having an output connected to the DC bus and an input connected to the DC power source, said converter providing power to the DC bus based on the DC power available from the DC power source;
   a battery; and
   a device coupled to the battery and to the converter, wherein the device controls the flow of current to and from the battery, and wherein the device controls the amount of DC power supplied from the battery to the DC bus, based on the amount of DC power provided from the DC power source to the DC bus.

9. The system of claim 8, wherein the device comprises a controllable semiconductor.

10. The system of claim 8, wherein the controllable semiconductor is a MOSFET.

11. The system of claim 10, wherein the MOSFET is coupled in anti-parallel with a diode.

12. The system of claim 11, wherein the diode is a body diode of the MOSFET.

13. The system of claim 11, wherein the diode is a Schottky diode.

14. The system of claim 10, wherein the MOSFET is operated in its active region to maintain a constant float voltage across the battery.

15. The system of claim 8, wherein the device comprises a noncontrollable semiconductor.

16. The system of claim 15, wherein the noncontrollable semiconductor is a diode.

17. The system of claim 8, wherein the converter operates to increase voltage.

18. The system of claim 8, wherein the converter is a boost converter.

19. The system of claim 8, further comprising an isolation device coupled to the DC-to-AC inverter.

20. The system of claim 19, wherein the isolation device is an electrical transformer.

21. The system of claim 8, further comprising a current protection device coupled to the DC bus and designed to prevent current from being applied to the DC power source.

22. The system of claim 21, wherein the converter reduces the current in the current protection device to a level below the level of current drawn by the power source.

23. The system of claim 8, further comprising an input filter coupled to the DC power source and to the converter.

24. The system of claim 8, wherein the DC-to-AC inverter comprises an H-bridge inverter.

25. The system of claim 8, wherein the DC-to-AC inverter is designed to operate with a low voltage input.

26. The system of claim 8, wherein when an increase in load demand occurs, the device permits power from the battery to flow to the DC bus to meet the increased demand until the DC power source is able to support the increased load demand.

27. The system of claim 8, wherein the converter regulates power drawn from the DC power source during load transients.

28. The system of claim 8, wherein the converter and the device operate to maintain a substantially constant voltage on the DC bus.

29. The system of claim 8, further comprising an electrical power grid coupled to the controller.

30. The system of claim 8, wherein the DC power source is a fuel cell.

31. The system described in claim 8, wherein the converter and the controller device maintain a substantially constant voltage across the DC bus.

32. A device for converting electrical voltage from a fuel cell to an AC voltage, comprising:
   a DC bus;

an inverter coupled to the DC bus, wherein the inverter converts DC voltage from the DC bus to an AC voltage;

a battery;

a controller device coupled to the battery and to the DC bus, wherein the controller device controls the flow of current to and from the battery, and wherein power is controlled from the battery based on DC power provided from the DC power source to the DC bus; and a boost converter having an input connected to the fuel cell and an output connected to the controller device and the DC bus, said boost converter being operable to regulate power provided from the fuel cell to the DC bus based on the DC power available from the DC power source, wherein the boost converter provides a charging current to the battery and protects against current flowing to the fuel cell.

33. The device of claim 32, further comprising an electrical transformer for providing electrical isolation between the fuel cell and the load.

34. The device of claim 32, further comprising an electrical transformer for changing the output voltage of the inverter to another voltage.

35. The device of claim 32, further comprising an electrical transformer for providing a center tap in the output voltage.

36. The device of claim 32, wherein when an increase in load demand occurs, the inverter draws power from the battery via the controller device equal to the increased demand until the fuel cell is able to support the increased load demand.

37. The device of claim 32, wherein the inverter is an H-bridge inverter.

38. The device of claim 32, wherein the boost converter regulates power drawn from the fuel cell during load transients.

39. The device of claim 32, wherein the inverter draws power from the battery when load demands exceed a capacity of the fuel cell.

40. The system of claim 32, wherein the controller device comprises a controllable semiconductor.

41. The system of claim 32, wherein the controller device comprises a noncontrollable semiconductor.

* * * * *